FIG I — BLUE SENSITIVE EMULSION; GELATIN LAYER CONTAINING AS A FILTER DYE A SCHIFF'S BASE DERIVED FROM AN O-HYDROXY ALDEHYDE AND A 1-NAPTHYLAMINE SUBSTITUTED IN THE 8-POSITION BY HALOGEN, SULFO, CYANO, ALKOXY, ALKYL, CARBOXY OR NITRO; GREEN SENSITIVE EMULSION; RED SENSITIVE EMULSION; FILM BASE

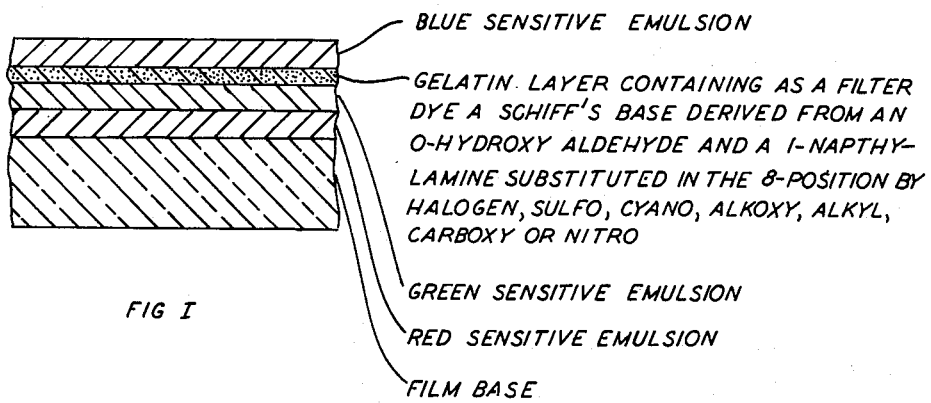

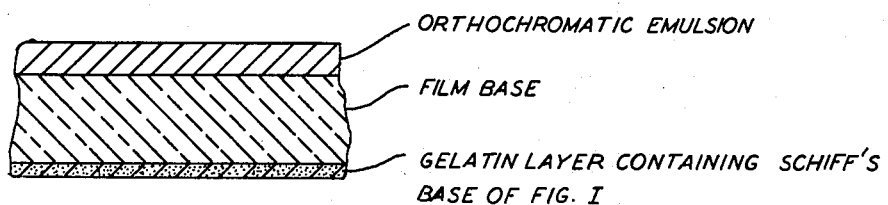

FIG II — ORTHOCHROMATIC EMULSION; FILM BASE; GELATIN LAYER CONTAINING SCHIFF'S BASE OF FIG. I

INVENTOR
VSEVOLOD TULAGIN

United States Patent Office 2,750,291
Patented June 12, 1956

2,750,291

PHOTOGRAPHICALLY SENSITIVE ELEMENT CONTAINING YELLOW NON-FLUORESCING DYES

Vsevolod Tulagin, Binghamton, N. Y., assignor to General Aniline & Film Corporation, New York, N. Y., a corporation of Delaware Application January 14, 1953, Serial No. 331,311

6 Claims. (Cl. 95—8)

The present invention relates to irreversibly dischargeable photographic filter and antihalation layers containing, as the active filtering agent, a yellow non-diffusing Schiff's base.

In my U. S. Patent 2,695,233, granted November 23, 1954, entitled "Irreversibly Dischargeable Photographic Filter Layers and Method of Processing Film Containing the Same" I described filter dyes prepared by the reaction of an ortho-hydroxy aldehyde with a primary aliphatic or aromatic amine. It was noted in this application that the dyes could be discharged by a special treatment involving the utilization of hydrazine, hydroxylamine or a semi-carbazide, or a salt of any of these bases.

The earlier experimental work carried out with the dyes of said application established that they were apparently of great importance in color photography, inasmuch as they permitted considerable improvement in color separation and an increased speed in the magenta layer. Unfortunately, however, later experiments showed that the processing suggested in said application left residual stains, thereby reducing the value of the dyes for commercial operation.

Further work, which is reported in my U. S. Patent 2,687,353, granted August 24, 1954, entitled "Method of Discharging Irreversibly Dischargeable Photographic Filter Layers," established that certain yellow Schiff's bases within the ambit of the earlier application could be discharged without residual stain, by the employment of dilute aqueous solutions of primary aliphatic amines. The Schiff's bases having this property were those obtained by condensing a sulfonated ortho-hydroxy aldehyde of the benzene or naphthalene series with a primary aromatic amine containing at least one water solubilizing sulfo or carboxy group. Not only did the method of processing, described in U. S. Patent 2,687,353, have the advantage that residual stain was avoided in dye discharge, but it had the additional advantage that a special step in the process was eliminated. It is to be pointed out, in this connection, that since the primary aliphatic amines are compatible with the components of a fixing bath, it was possible to incorporate the amines in said bath and to effect dye discharge therein.

It had been expected that substantial results would ensue by adoption of the invention of U. S. Patent 2,687,353. Still further experiments, however, disclosed the unexpected fact that practically all of the Schiff's bases of my earlier applications had the undesirable property of yellow fluorescence which was activated by the blue region of the spectrum. This seriously reduced the benefit potentially possible from the use of said Schiff's bases and the processing described in U. S. Patent 2,687,353.

I have now discovered that the aforesaid undesirable fluorescence can be greatly mitigated by placing proper substituents on the dye molecule of said Schiff's bases in proximity to the chromophore thereof. More particularly, it was found desirable to throw the aryl ring attached to the nitrogen atom out of plane with the chelate ring of the dye structure. This may be illustrated as follows:

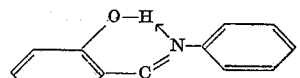

In Plane

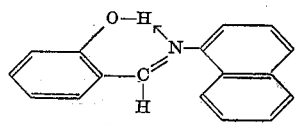

Out of Plane

As is evident from this illustration, the groups which I have found to be especially useful for attaining the above result are the peri-derivatives of 1-naphthylamine. The formation of Schiff's bases from ortho-hydroxy aldehydes and periderivatives of 1-naphthylamine, and their use as filter and antihalation dyes, accordingly constitute the purposes and objects of the present invention.

The yellow Schiff's bases, the use of which is contemplated herein, may be derived from the condensation of any ortho-hydroxy aldehyde of aromatic character with a 1-naphthylamine in which the 8- or peri-position is substituted by halogen, such as chlorine, bromine or the like, alkoxy, such as methoxy, ethoxy or the like, alkyl, such as methyl, ethyl, propyl or the like, sulfo, carboxy, nitro or cyano. It is, of course, understood that the naphthalene ring might bear other substituent groups which do not interfere with such condensation as, for example, halogen as above, sulfo, carboxy, nitro, acylamino, such as acetylamino and the like.

These Schiff's bases may be more properly characterized by the following structural formulae:

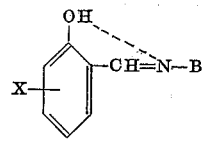

and

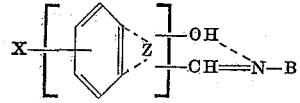

in which X is hydrogen, alkyl, such as methyl, ethyl, propyl, butyl or the like, hydroxyalkyl, such as hydroxymethyl, hydroxyethyl or the like, aryl, such as phenyl, toluyl or the like, nitro, hydroxy, sulfo, carboxy, acylamino, such as acetylamino, butyrylamino, lauroylamino, stearoylamino or the like, alkylamino, such as methylamino, ethylamino, butylamino, decylamino, dodecylamino, octadecylamino, dimethylamino and the like, cyano and acyloxyalkyl, such as carboxymethyl and the like, Z represents the atoms necessary to complete a 6-membered aromatic or heterocyclic ring containing a conjugated unsaturated system, such as benzo, pyrido and the like, and B is naphthyl, the nitrogen atom of the indicated azomethine group being in the 1-position thereof, and the 8-position thereof being substituted as indicated above, to wit, by halogen, alkoxy, alkyl, sulfo, carboxy, nitro or cyano.

In the above compounds the hydroxyl group is always in ortho-position to the azomethine linkage. It has been found that the above configuration is essential to the dye system. It is supposed that a hydrogen bond is formed between the oxygen and nitrogen atoms. This has been indicated in the above formulae by the dotted lines running from the hydroxyl group to the nitrogen atom of the azomethine linkage.

Examples of Schiff's bases which I have found suitable for my purposes are the following:

(1) 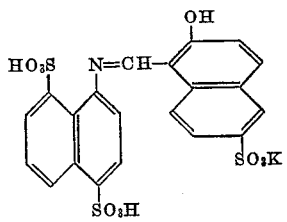

(2) 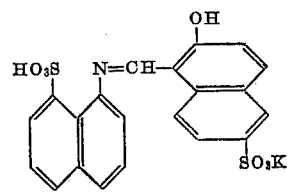

(3) 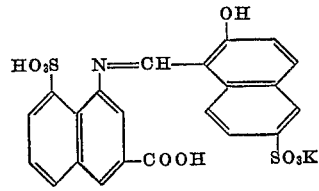

(4) 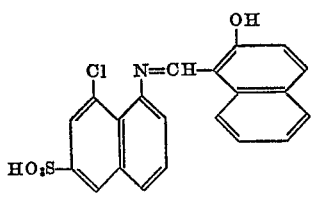

(5) 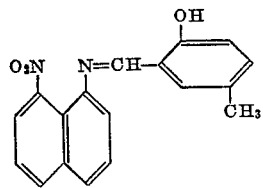

(6) 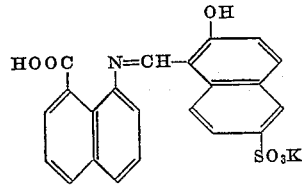

(5) 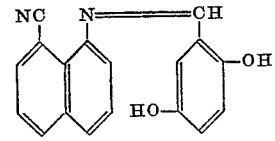

(8) 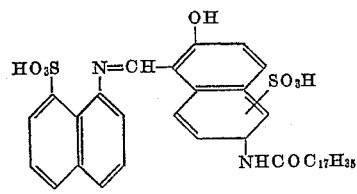

(9) 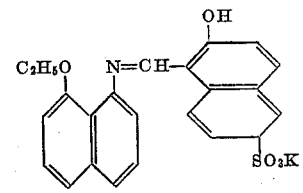

(10) 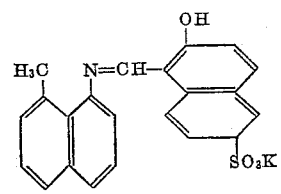

(11) 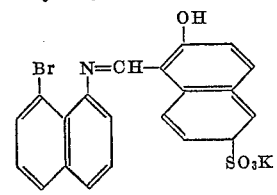

(12) 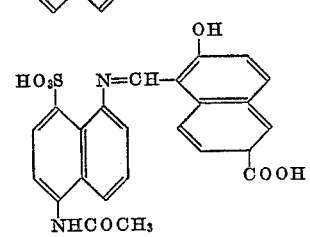

(13) 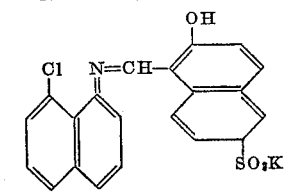

(14) 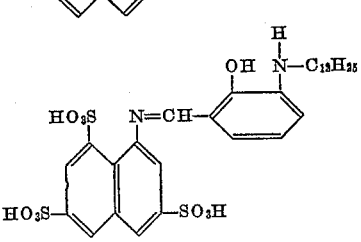

The above compounds may be prepared by heating the selected ortho-hydroxy aldehyde with the selected 1-naphthylamine properly substituted in the 8-position as follows:

To a solution of 1 mol of the aldehyde in a minimum quantity of boiling acetic acid is added 3 mols of pyridine and somewhat less than 1 mol of the 1-naphthylamine. The mixture is boiled for 3–5 minutes and added to a large volume of ether. The precipitated dye is collected by filtration, washed with acetone and may be used without purification.

The aldehydes which may be used in producing the Schiff's bases are those disclosed in my aforesaid U. S. Patents 2,695,233 and 2,687,353. Examples of such aldehydes are 5 - formyl-6-hydroxynaphthalene-2-sulfonate, salicyl aldehyde, 2-methyl-4,6-dihydroxybenzaldehyde, 2-hydroxy-1-naphthaldehyde, 2-formyl-3-hydroxyquinoline, 1 - formyl - 2 - hydroxy-6-stearoylaminonaphthalene-4-sulfonic acid, 2-hydroxy-5-methylbenzaldehyde, and the like.

Examples of 1-naphthylamines substituted in the 8-position which may be utilized are 1-aminonaphthalene-4,8-disulfonic acid, 1-aminonaphthalene-8-sulfonic acid, 1-amino-3-carboxynaphthalene-8-sulfonic acid, 1-amino-8-chloronaphthalene-6-sulfonic acid, 8-nitro-1-naphthylamine, 1-amino-8-naphthoic acid, 1-amino-8-naphthonitrile, 8 - ethoxy-1-naphthylamine, 8-methyl-1-naphthylamine, 8 - bromo - 1-naphthylamine, 1-amino-5-acetylaminonaphthalene - 8 - sulfonic acid, 8-chloro-1-aminonaphthalene-3,6,8-trisulfonic acid, and the like.

The filter layers of the present invention, (it being understood that the term "filter layers" is to be construed to embrace antihalation layers) are prepared by the incorporation of the aforesaid dyes in a colloidal carrier therefor. As the carrier there may be used such colloids as gelatin, polyvinyl alcohol, copolymers of maleic anhydride with methylvinyl ether and the like. Those dyes which are soluble in water may be incorporated in the carrier by adding to a water solution of the selected dyestuff slowly and with agitation a 10% aqueous solution of the desired colloid. Conversely, any of the dyes may be prepared for incorporation in the carrier by dissolving the same in water containing a little pyridine. The solutions thus obtained are then used to dye a foil of the carrier.

The filter dyes may be discharged in the processing of the film containing filter or antihalation layers derived therefrom either by the use of hydroxylamine, hydrazine or a semi-carbazide, or a salt of any of such bases, i. e., by the method of my U. S. Patent 2,695,233, or by the use of aliphatic amines, as per my U. S. Patent 2,687,353; if, by the latter method, then it is preferable to incorporate the aliphatic amine in the fixing bath.

The following examples serve to illustrate the invention particularly when taken with the accompanying self-explanatory drawing, Figure I of which depicts the use of the Schiff's base as a filter layer in multilayer color material, and Figure II of which depicts the use of such bases as an antihalation layer for orthochromatic film. It is to be understood that the invention is not restricted to said examples and illustration. Parts are by weight unless otherwise stated.

SECTION I.—PREPARATION OF DYES

*Example 1*

To a solution of 1 mol of potassium-5-formyl-6-hydroxynaphthalene-2-sulfonate in a minimum quantity of boiling acetic acid, is added 3 mols of pyridine and slightly less than 1 mol of 1-aminonaphthalene-8-sulfonic acid. The mixture is boiled for 3–5 minutes and then added to a large volume of ethyl ether. The precipitated dye is collected by filtration, washed with acetone and may be used without further purification.

*Example 2*

A mixture of 1 part of 1-amino-3-carboxynaphthalene-8-sulfonic acid, 1 part of potassium-5-formyl-6-hydroynaphthalene-2-sulfonate, 1 part of pyridine and 50 parts by volume of methanol was refluxed for 3 hours and then cooled to 0° C. The precipitated dye was collected by filtration, washed with methanol and dried.

*Example 3*

The procedure is the same as in Example 1, excepting that the 1-aminonaphthalene-8-sulfonic acid is replaced by an equivalent amount of 1-amino-8-chloronaphthalene-6-sulfonic acid.

*Example 4*

The procedure is the same as in Example 1, excepting that the aldehyde of Example 1 is replaced by 2-hydroxy-1-naphthaldehyde.

*Example 5*

The procedure is the same as in Example 1, excepting that the 1-aminonaphthalene-8-sulfonic acid is replaced by 1-amino-8-naphthoic acid.

SECTION II.—PREPARATION OF PHOTOGRAPHIC ELEMENTS

*Example 6*

600 milligrams of the dye of Example 1 were dissolved in 40 parts of water containing a small amount of pyridine. To the resulting solution were added slowly with agitation 20 cc. of a 10% aqueous gelatin solution. The resulting solution was cast onto a support serving as a base for an orthochromatic film.

It was found that the resulting antihalation layer acted as an effective filter for the blue light transmitted by the emulsion layer, and that the dye gave no yellow fluorescence.

*Example 7*

A red sensitized silver bromide emulsion containing a phenolic color former fast to diffusion was coated upon a base and over this was cast a green sensitive silver bromide emulsion containing a pyrazolone color former fast to diffusion. Over the green sensitive layer is cast a filter layer prepared from the solution of the preceding example. Over the filter layer is cast a blue sensitive emulsion containing an aceto-acetanilide color former fast to diffusion.

The resulting film is exposed, developed in a black and white developer, washed, re-exposed and developed in a p-diethylaniline developer. The film is then bleached and fixed in the following solution:

| | | |
|---|---|---|
| Sodium thiosulfate | grams | 200 |
| Sodium metaborate | do | 25 |
| Ethanol amine | cc | 15 |
| Water to make | cc | 1000 |

The film is then short-stopped and immersed in a 50% sodium bicarbonate solution, washed and dried. It will be found that the yellow filter has been completely removed and that no yellow stains remain. More important still, is the fact that the filter layer exhibits no yellow fluorescence, even when exposed to blue light rays.

Modifications of the invention will occur to persons skilled in the art. Thus, it is evident that any of the aldehydes previously referred to may be combined with any of the 1-naphthylamines to form satisfactory yellow colorants for filter or antihalation layers, and that such colorants will not have the objectionable characteristic of yellow fluorescence. I, therefore, do not intend to be limited in the patent granted, except as required by the appended claims.

I claim:

1. A light sensitive photographic element comprising a base and a light sensitive silver halide emulsion layer and including a water soluble colloid dyed with an irreversibly dischargeable Schiff's base substantially devoid of yellow fluorescence, said Schiff's base being selected from the class consisting of those of the following formulae:

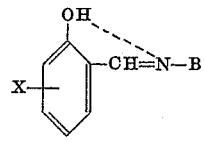

and

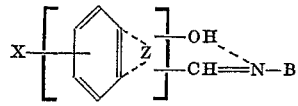

wherein the hydroxyl group is always ortho to the azomethine linkage, and in which X is a member selected from the class consisting of hydrogen, alkyl, hydroxyalkyl, aryl, alkylamino, acylamino, acyloxyalkyl, hydroxy, nitro, sulfo, carboxy and cyano, Z represents the atoms necessary to complete a 6-membered ring selected from the class consisting of aromatic rings and heterocyclic rings containing a conjugated unsaturated system, and B is a naphthyl radical, the carbon atom in the 1-position of which is joined to the nitrogen atom of the azomethine linkage, and the carbon atom in the 8-position of which is substituted by a radical selected from the class consisting of halogen, sulfo, cyano, alkoxy, alkyl, carboxy and nitro.

2. The light-sensitive photographic element, as defined in claim 1, wherein the Schiff's base has the following formula:

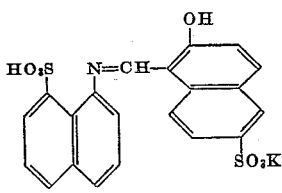

3. The light sensitive photographic element as defined in claim 1, wherein the Schiff's base has the following formula:

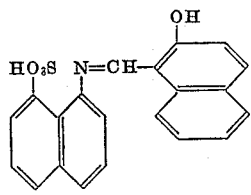

4. The light sensitive photographic element as defined in claim 1, wherein the Schiff's base has the following formula:

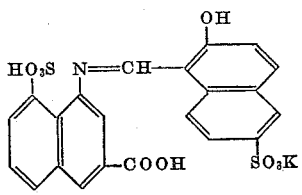

5. The light sensitive photographic element as defined in claim 1, wherein the Schiff's base has the following formula:

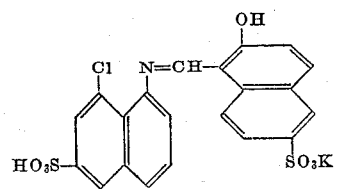

6. The light sensitive photographic element as defined in claim 1, wherein the Schiff's base has the following formula:

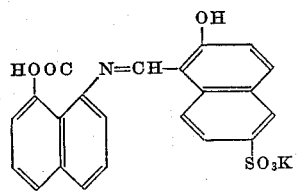

References Cited in the file of this patent

UNITED STATES PATENTS

| | | |
|---|---|---|
| 2,078,398 | Mannes et al. | Apr. 27, 1937 |

FOREIGN PATENTS

| | | |
|---|---|---|
| 894,181 | France | Mar. 6, 1944 |
| 622,731 | Great Britain | May 6, 1949 |